C. B. YAW.
TYPE WRITING MACHINE.
APPLICATION FILED OCT. 29, 1907.
947,269.
Patented Jan. 25, 1910.
8 SHEETS—SHEET 3.
FIG. 4.
FIG. 3.
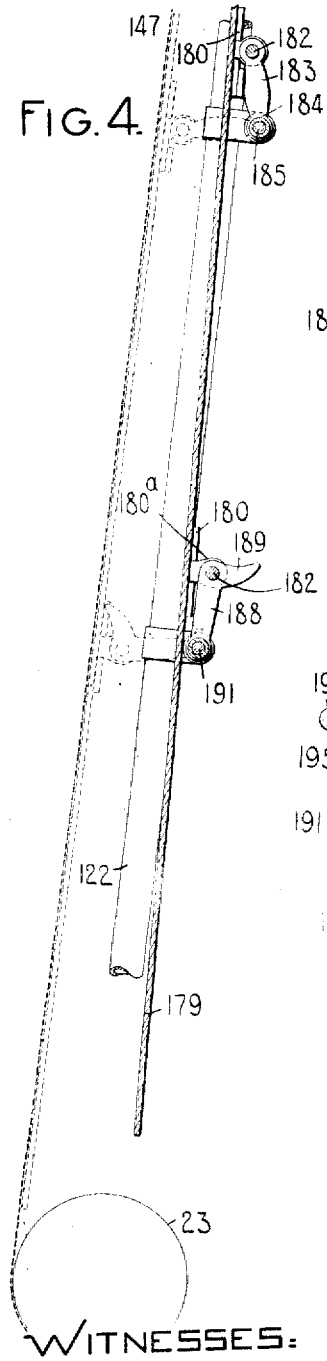
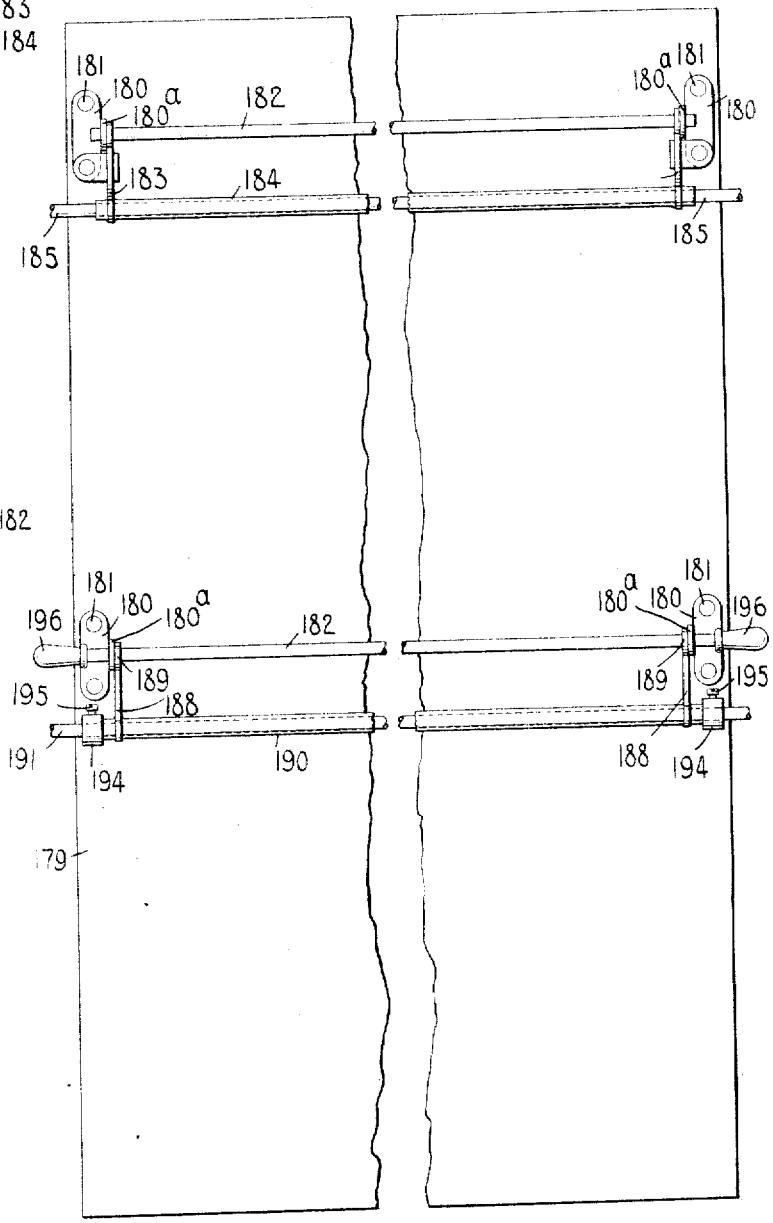
WITNESSES:
M. F. Hanneker
M. W. Pool
INVENTOR:
Clio B. Yaw
By Jacob Felbel
HIS ATTORNEY

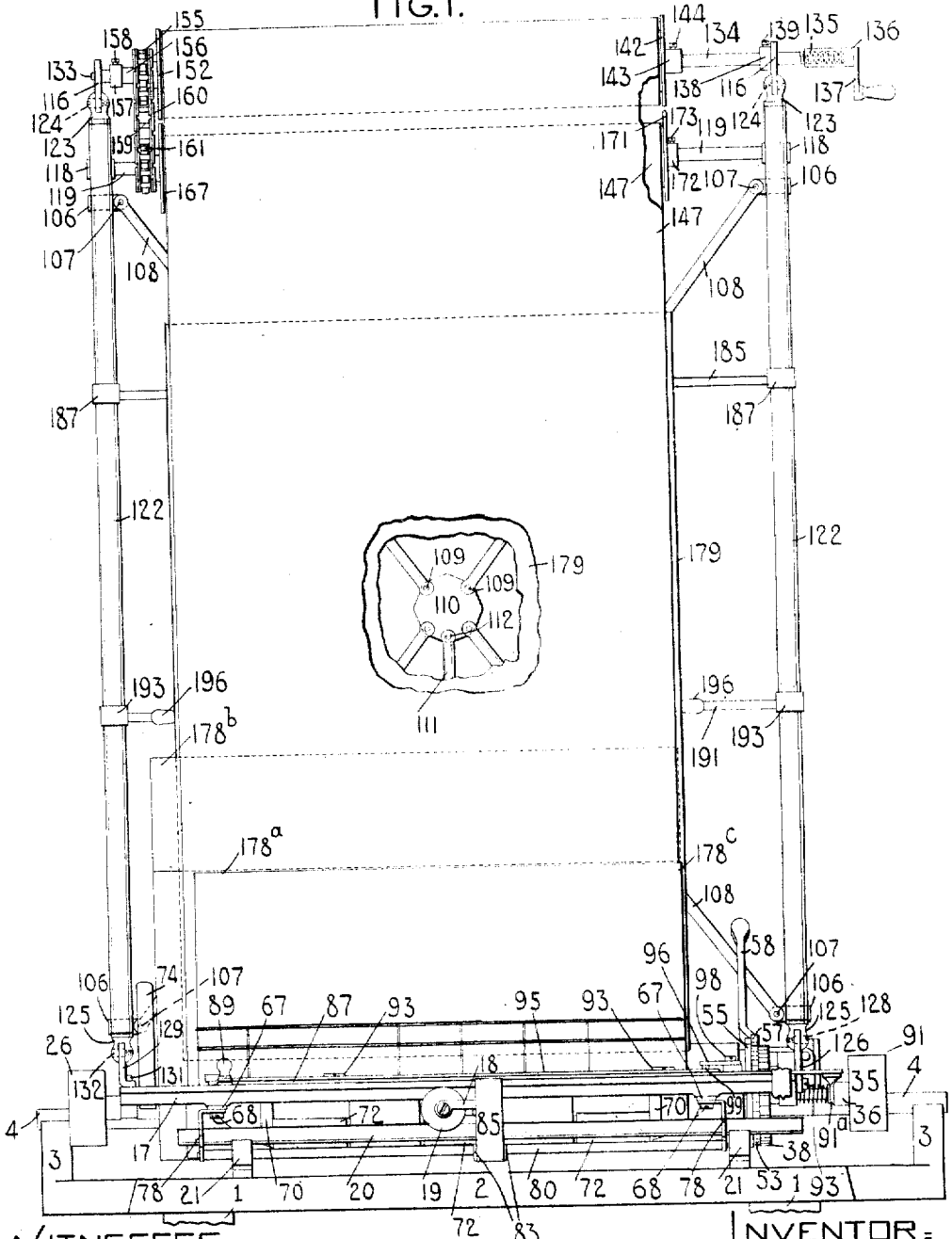

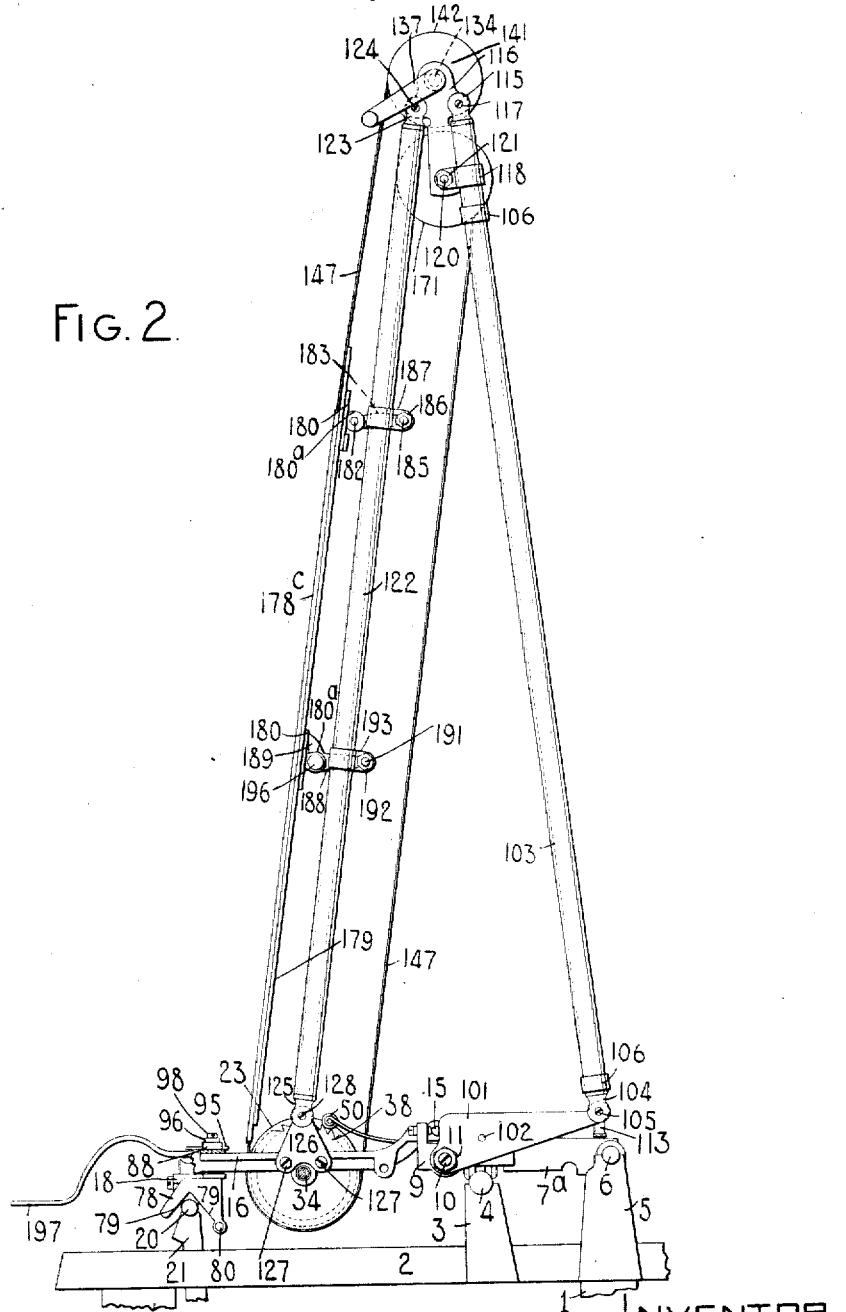

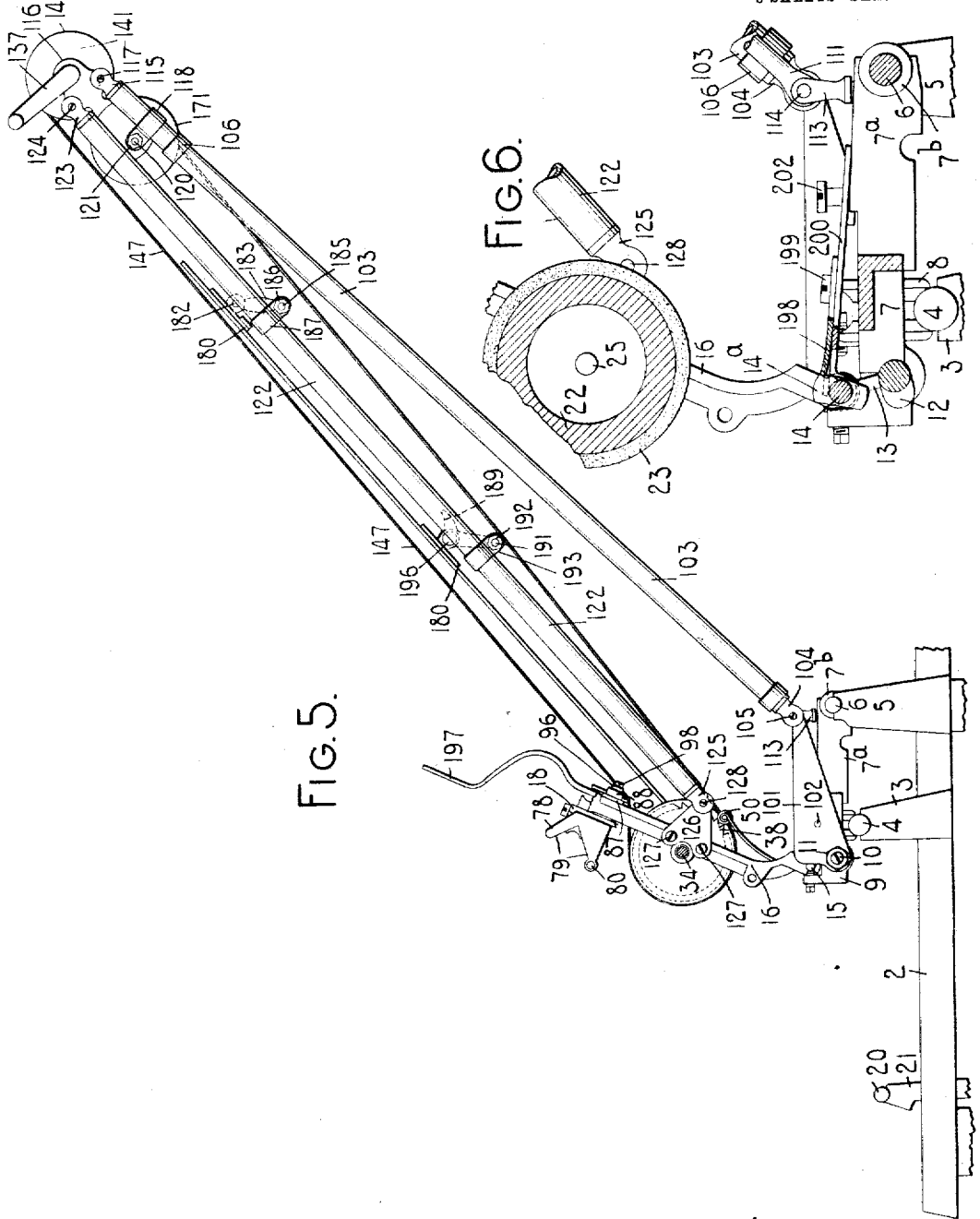

C. B. YAW.
TYPE WRITING MACHINE.
APPLICATION FILED OCT. 29, 1907.
947,269.
Patented Jan. 25, 1910.
6 SHEETS—SHEET 5.
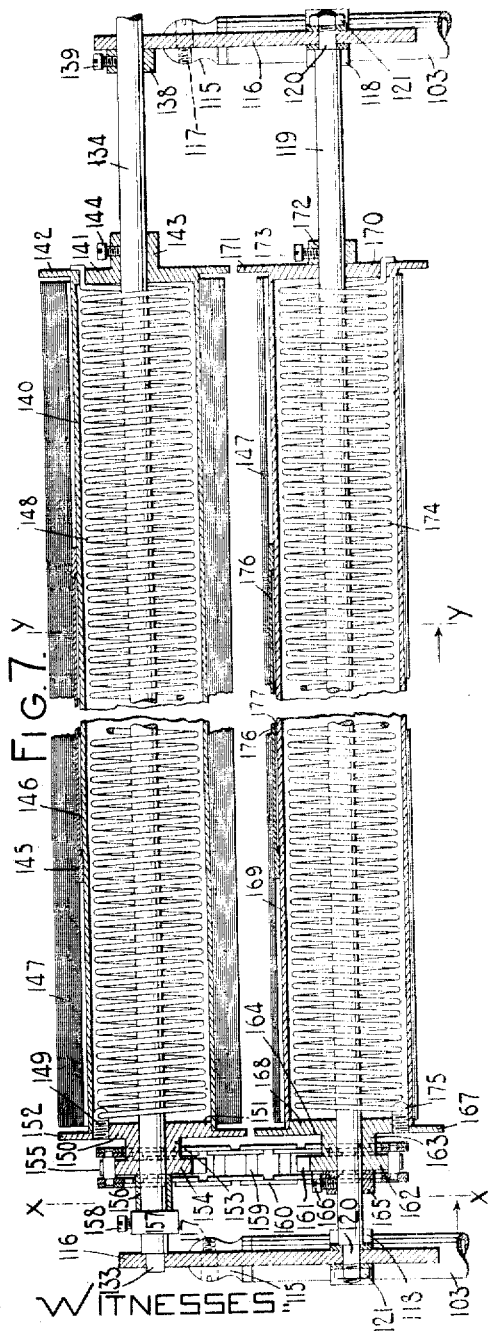
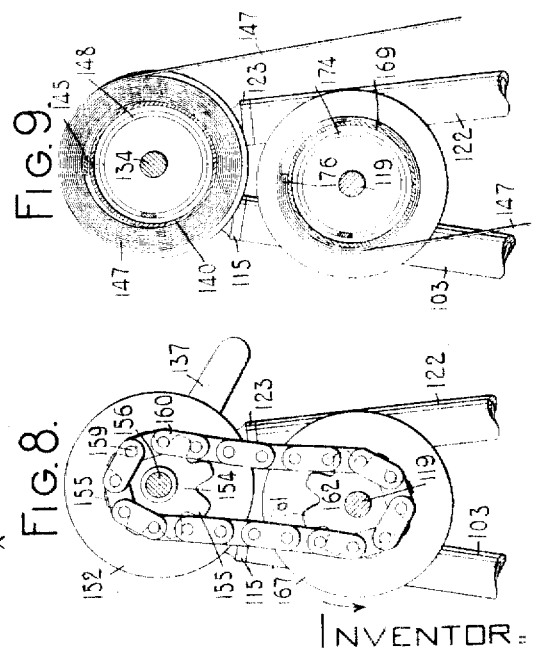
WITNESSES
M. F. Hannweber
M W Pool
INVENTOR:
Ellis B. Yaw
By Jacob Felbel
HIS ATTORNEY

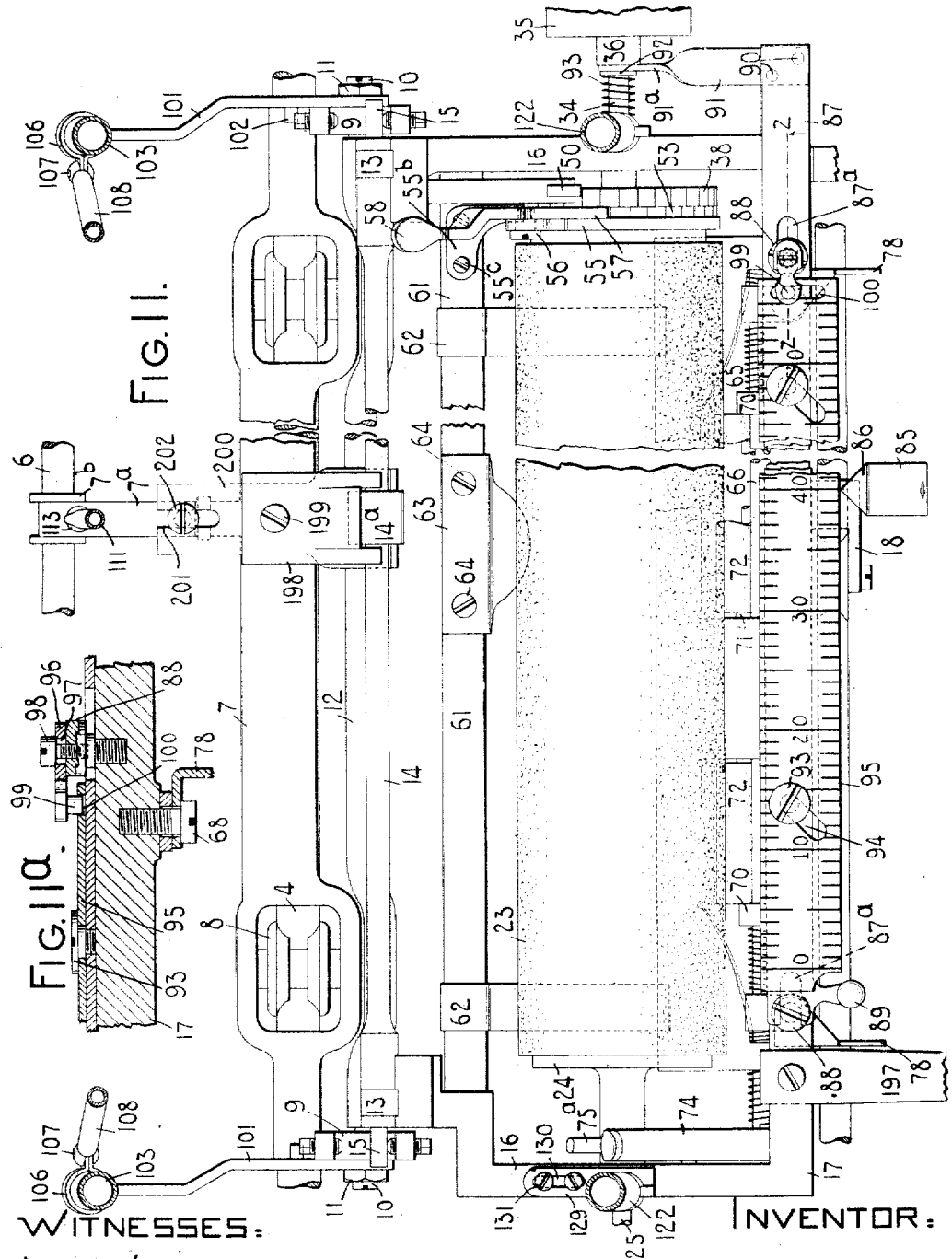

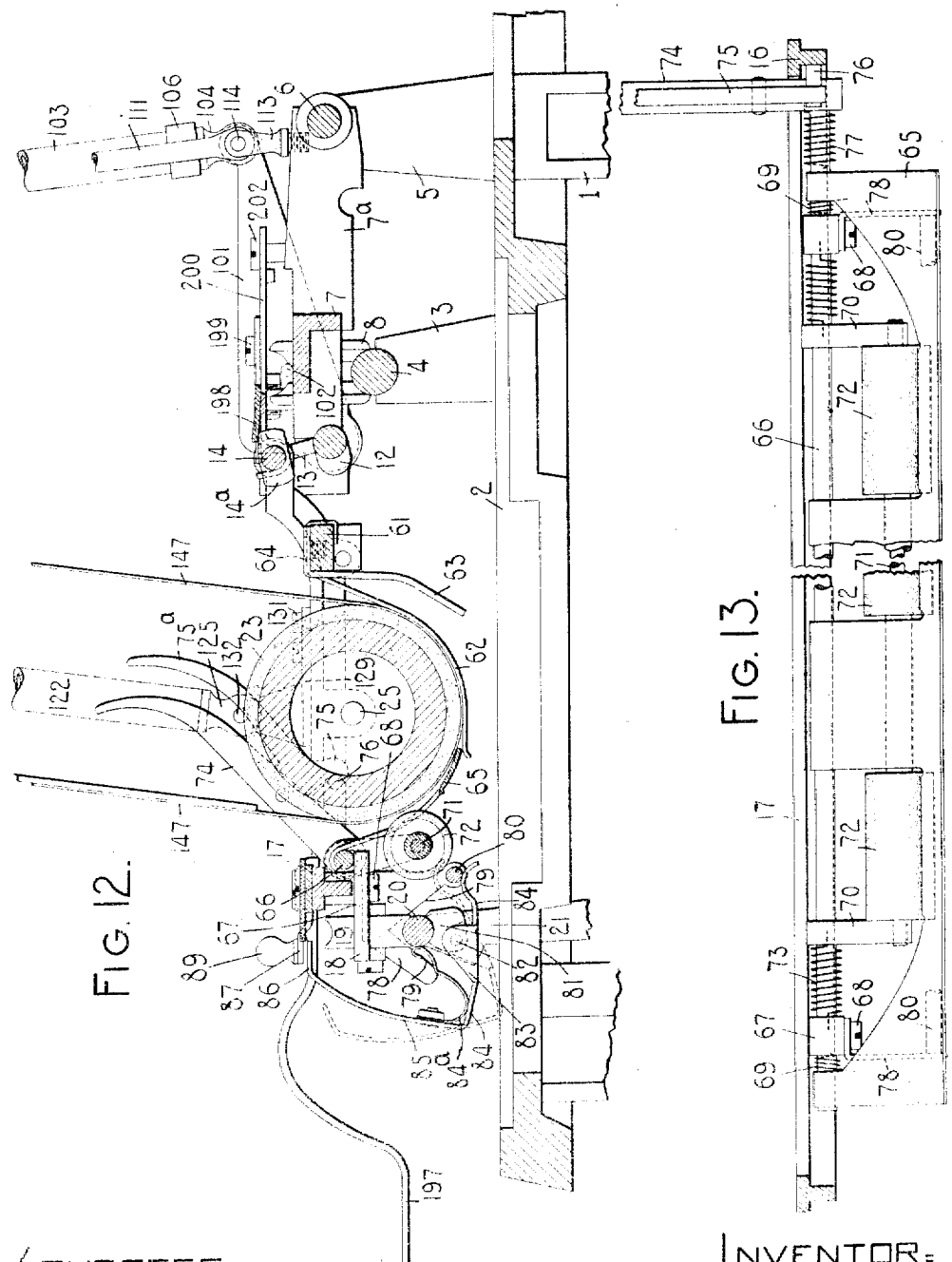

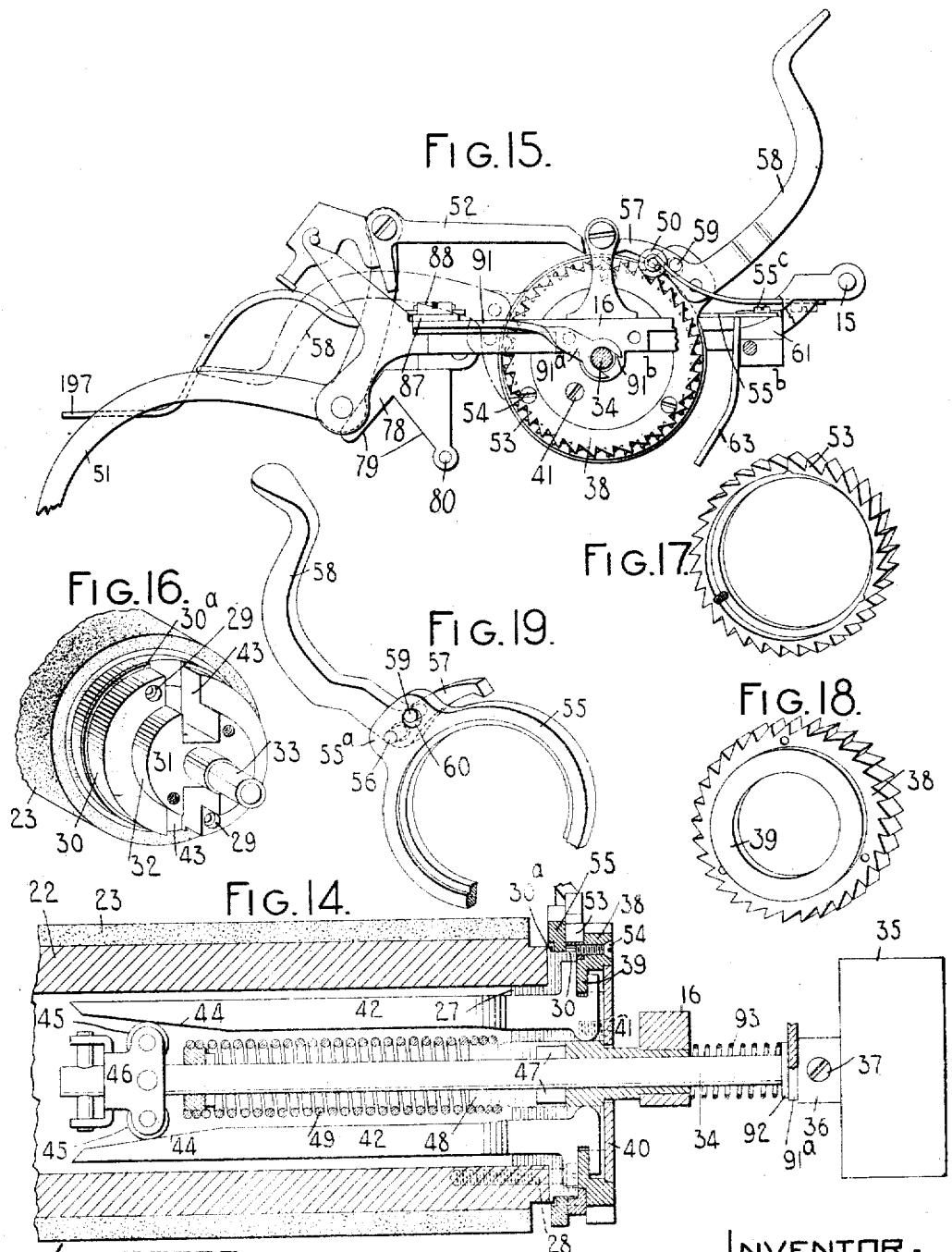

UNITED STATES PATENT OFFICE.

CLIO B. YAW, OF ARLINGTON, NEW JERSEY, ASSIGNOR TO WYCKOFF, SEAMANS & BENEDICT, OF ILION, NEW YORK, A CORPORATION OF NEW YORK.

TYPE-WRITING MACHINE.

947,269.  Specification of Letters Patent.  Patented Jan. 25, 1910.

Application filed October 29, 1907. Serial No. 399,757.

*To all whom it may concern:*

Be it known that I, CLIO B. YAW, citizen of the United States, and resident of Arlington, in the county of Hudson and State of New Jersey, have invented certain new and useful Improvements in Type-Writing Machines, of which the following is a specification.

My invention relates to typewriting machines and its object, generally stated, is to equip such machines with an improved mechanism of the character commonly termed a carbon roll mechanism.

To the above general end my invention consists in the features of construction, arrangements of parts and combinations of devices hereinafter described and particularly pointed out in the claims.

The invention is illustrated as applied to a Remington typewriting machine but the nature of the invention is such that it may be embodied in other styles of writing machines.

In carrying out my invention I have besides providing improved devices for handling a roll of material such as carbon paper or other transfer medium also provided other devices and have modified some of the mechanism of the machine to which my invention is shown as applied so as greatly to facilitate the handling of the classes or kinds of work to which my invention is especially adapted.

Although the various features of my invention have been devised for the primary object above stated, it is to be understood that some of said features may be used without others and that some of said features are capable of use in other relations than those shown.

One form of the invention is illustrated in the accompanying drawings, wherein—

Figure 1 is a front elevation of the upper part of a Remington typewriting machine showing my invention applied thereto, parts of the machine being omitted and parts broken away. Fig. 2 is a side elevation of the upper part of the machine showing my invention in place thereon, parts of the machine being omitted and parts broken away. Fig. 3 is a fragmentary rear elevation of a part of my invention hereinafter termed a paper support or table. Fig. 4 is a central longitudinal sectional view of the paper table shown in Fig. 3. Fig. 5 is a side elevation of the upper part of the machine similar to Fig. 2 but showing my invention and allied parts in different relations. Fig. 6 is a fragmentary fore and aft sectional view of the platen and carriage showing the parts in the relations in which they appear in Fig. 5, Fig. 6 being drawn to a larger scale than Fig. 5. Fig. 7 is a sectional view taken longitudinally through the receiving and delivery roll holders of the carbon roll device. Fig. 8 is a sectional view taken on a plane represented by the line $x-x$ in Fig. 7 and looking in the direction of the arrow at said line. Fig. 9 is a sectional view taken on a plane represented by the line $y-y$ in Fig. 7 and looking in the direction of the arrow at said line. Fig. 10 is a face view of one of the roll holders showing the method of attaching the carbon paper or other material to said roll holder. Fig. 11 is a fragmentary top plan view of the platen and carriage of the machine and showing parts of my invention in section. Fig. 11$^a$ is an enlarged sectional view taken on a plane represented by the line $z$ in Fig. 11 and looking in the direction of the arrow at said line. Fig. 12 is a fragmentary sectional view taken transversely through the platen and carriage and showing also the upper part of the frame of the machine and parts of my invention. Fig. 13 is a fragmentary sectional view looking from the rear toward the front and showing part of the paper feeding devices which coöperate with the platen. Fig. 14 is a fragmentary sectional view taken centrally and longitudinally of the platen and showing the right-hand end portion thereof. Fig. 15 is a fragmentary end view showing the platen and various line spacing devices, the platen finger wheel being sectioned away. Fig. 16 is a perspective view of the right-hand platen head. Fig. 17 is a perspective view of a special or supplementary ratchet wheel connected with the platen. Fig. 18 is a perspective view of the line spacing ratchet wheel. Fig. 19 is a fragmentary perspective view of the device for operating the ratchet wheel shown in Fig. 17.

Referring first more particularly to Figs. 1, 2, 11, 12 and 13 of the drawings, the main frame of the machine is shown as comprising corner posts 1 supporting a top plate 2.

Standards 3, rising from the top plate, support a stationary track-way 4, and standards 5, rising from the top plate in rear of the standards 3, support a rear guide rod 6. A carriage truck 7 is provided with rollers 8 which run on the track-way 4. Integral with the truck and extending rearwardly therefrom is a central horizontal arm 7ᵃ carrying a guide spool 7ᵇ and which coöperates with the guide rod 6. The truck 7 has forwardly and upwardly extending side bars or brackets 9. Pivot screws 10 having locking nuts 11 extend through the side bars 9, said pivot screws having conical inner ends which engage depressions in the ends of a rock shaft 12. The rock shaft near its ends is provided with upwardly extending crank arms 13 which enter slots in the rear bar 14 of a platen frame or carrier, said crank arms being pivotally connected with the rear bar 14 by pins 15. In addition to the rear bar 14 the platen frame comprises side bars 16 and a front bar 17. The front bar carries a block 18 in which is pivoted a wheel or roller 19, said roller running on a shiftable guide rail 20, the latter being carried at the upper ends of arms 21 pivotally mounted on the machine frame and adapted to be actuated to change case in the usual manner. The platen frame and the truck above described constitute a carriage for a platen, which platen comprises the usual wooden core 22 and rubber covering or sheath 23. The platen is provided with the usual left-hand platen head 24 and axle section 25, the latter bearing in the left-hand side bar 16 of the platen frame and being provided with a finger wheel 26.

At its right-hand end the platen is preferably provided with a platen releasing or fractional line spacing mechanism, such for example as shown in the patents to Woodward Nos. 784,368 and 784,369, dated March 7th, 1905 and illustrated in Figs. 14, 16 and 18 of my drawings. This mechanism is used in connection with novel indicating devices hereinafter described, and a brief description of said mechanism will now be given.

Referring to Figs. 14, 16 and 18, the right-hand platen head has a reduced portion 27 which is seated in the core 22 of the platen, the platen head being secured to the core by screws 28 which pass through openings 29 in the platen head, and thence into the core. The right-hand platen head is provided outside of the core of the platen with a track-way or bearing surface 30 and with a reduced hub portion 31 providing a second track-way or bearing surface 32 of less diameter than the track-way 30. Extending rightward from the hub portion 31 is a nipple 33 which engages in a bearing opening in the right-hand side bar 16 of the platen frame. The right-hand platen head is formed with a central bore extending through it from end to end, said bore receiving an axle section or spindle 34, the outer end of which is provided with a finger wheel 35, the latter having a hub portion 36 which receives a screw 37 by which the finger wheel is fixed to the spindle. The track-way 32 has mounted on it a ratchet wheel 38, the latter having a flange 39 which coöperates with the track-way, and being maintained in place by a cover plate 40 which is attached to the hub 31 by screws 41. The flange 39 is embraced by the gripping jaws of a pair of grippers 42 which are arranged in slots or cut-aways 43 formed in the right-hand platen head, the noses of the grippers coöperating with the bottoms of the slot ways 43. The inner inclined edges 44 of the grippers are adapted to coöperate with rollers 45 carried by a device 46 mounted on the inner end of the spindle 34. This spindle may move endwise in the right-hand platen head but is prevented from turning independently of said platen head by wings 47 extending oppositely from the spindle and coöperating with a slot-way 48 in the platen head. A contractile spring 49 is coiled around the spindle and is connected at its left end thereto and at its right end to the platen head. The spring pulls the spindle toward the right and normally maintains the parts in the relations shown in Fig. 14 with the grippers 42 in operative position, their gripping jaws clamping the flange 39 of the ratchet wheel 38 and thereby compelling the platen and the ratchet head to turn in unison. By pressing inward on the finger wheel 35, however, the grippers 42 may be released and the platen turned independently of the ratchet 38, the latter being held by the usual spring mounted roller detent 50 (Fig. 15). It will be understood that when the grippers 42 are in operation an actuation of the usual line spacing handle or lever arm 51 will cause the usual or a suitable line spacing pawl 52 to coöperate with the ratchet wheel 38 to effect line space turning movements of the platen. Reference may be had to the patents above referred to for a fuller description and explanation of the platen releasing mechanism. Of course any other suitable platen releasing mechanism may be used instead of the one shown.

My invention contemplates the employment at certain times of novel special platen rotating mechanism in addition to the usual or other suitable line spacing mechanism above briefly described, and a description of said special platen rotating mechanism will now be given in connection with Figs. 14 to 19 inclusive.

A ratchet wheel 53, shown in detail in Fig. 17, loosely surrounds the right-hand side portion of the track-way 30 on the right-hand platen head. The ratchet wheel 53 is rigidly connected with the ratchet wheel 38 b, screws 54 so that the two ratchet wheels are always compelled to turn together. The teeth of the ratchet wheel 53 correspond in number to the teeth of the ratchet wheel 38, but as will be seen best from a consideration of Fig. 15 the teeth of the wheel 53 are oppositely disposed to the teeth of the ratchet wheel 38. Coöperative with the ratchet wheel 53 is an actuating device shown in detail in Fig. 19 and comprising an annulus or ring 55 (shown partly broken away in Fig. 19) which surrounds and is adapted to turn on the left-hand side portion of the track-way 30. As shown in Fig. 14 the annulus is arranged side by side with and to the left of the ratchet wheel 53, the annulus being confined between the ratchet wheel 53 and a flange 30ᵃ on the right-hand platen head. Said annulus is provided with a lug 55ᵃ to which is pivoted at 56 an angular supplementary platen rotating or back setting lever comprising a pawl arm 57 and a handle or arm 58. The pawl tooth at the end of the arm 57 is adapted to coöperate with the teeth of the ratchet wheel 53 to afford a continuous turning movement of the platen in backward or reverse direction as will hereinafter be more fully described. Normally the pawl is disengaged from the ratchet wheel, however, as shown in Fig. 15, being held in that position by the weight of the arm 58. A limiting pin 59 extending laterally from the pawl arm 57 coöperates with an opening 60 of larger diameter formed in the lug 53ᵃ on the annulus 55 and serves to limit the motion of the lever 57, 58 about its pivot 56. The supplementary lever normally occupies the position shown in Fig. 15 in which position the annulus is arrested by the coöperation of the lug 55ᵃ with a stop arm 55ᵇ, said stop arm being secured by headed screws 55ᶜ to a cross bar 61 at the rear of the platen. The construction is such that if the lever 58 be drawn forward from its normal position shown in Fig. 15, until it is arrested by the front bar of the platen frame, the pawl 57 will first be moved into engagement with a tooth of the ratchet wheel 53 and will then turn said ratchet wheel and the platen in reverse direction through a predetermined distance.

Referring to the paper feeding devices which are adapted to coöperate directly with the platen, in the present case I prefer to arrange such devices in reverse of the usual order. That is to say, those devices which have heretofore been at the back of the platen I have placed at the front and vice versa. Having reference more especially to Figs. 11, 12 and 13, said paper feeding devices comprise a pair of paper fingers 62 of the usual or suitable construction, said paper fingers being adjustably mounted on a supporting or cross bar 61 which is arranged at the rear of the platen and is suitably secured at its ends to the side bars 16 of the platen frame. The paper fingers 62 extend downwardly and forwardly from said bar 61 and coöperate with the rear and under side of the platen. A central paper guide or deflector 63 is secured to the bar 61 by screws 64 and extends downwardly at the rear of the platen as shown. Coöperative with the front side of the platen is a curved paper guide or paper apron 65 pivotally mounted on a shaft 66 which is journaled in bearing blocks 67 secured to the under side of the front bar 17 of the platen frame near the ends thereof by headed screws 68. Wire springs 69 coiled around the shaft 66 coöperate with the paper apron 65 to press it constantly toward the platen. The shaft 66 has depending arms 70 secured to it, said arms carrying a feed roller shaft 71 which supports a sectional feed roller, the sections 72 whereof coöperate with the platen or the paper thereon through openings in the paper apron. Wire springs 73 coiled around the shaft 66 tend constantly to press the feed roller toward the platen. A release handle 74 is fixed to the shaft 66 near its right hand end, said handle carrying a pivoted latch 75 which is adapted when the handle is pressed rearwardly to the position shown in Fig 12 to engage with the locking pin 76 extending laterally inward from the left-hand side bar 16. When the releasing handle or lever arm 74 is pressed rearwardly it turns the shaft 66 and swings the paper feed roller away from the platen and the latch 75 and locking pin 76 coöperate to lock the feed roller in released position. When it is desired to restore the feed roller to operative position the finger portion 75ᵃ of the latch is pulled forward, thereby disengaging said latch from the pin 76. A restoring spring 77 assists to restore the feed roller and associate parts to working position.

The usual central yoke block on the platen frame and straddling the shift rail 20 is preferably dispensed with and in its place I provide two angled yoke plates 78 arranged one near each end of the platen frame and clamped against the under side of the blocks 67 by the headed screws 68 (Figs. 11, 12 and 13). The yoke plates 78 are each formed with a notch shaped like an inverted V, as clearly shown in Fig. 12, the edges of the notches being therein designated by the reference character 79. The notches are adapted to coöperate with the shift rail 20 in either of the positions to which said rail is shiftable, the result of such coöperation being to guide the roller 19 into engagement with the shift rail 20, whenever the platen carrier, having been lifted to expose the writing line or for any other purpose, is swung back to normal position.

The yoke plates 78 are connected by a cross rod 80, which serves to give rigidity to the yoke plates and also is adapted to coöperate with an indicating device or pointer shown in Figs. 1, 11 and 12. The indicating device preferably replaces the usual carriage pointer and is mounted on a block 81 suitably secured to the under side of the shift rail 20 midway of its length. The novel indicating device is pivoted to said block at 82 and is preferably made from a sheet metal blank bent to the shape most clearly shown in Fig. 12 and comprising ears 83 and a horizontally disposed arm 84 from which said ears are bent upward, said horizontal arm being curved upward at its rear end portion to coöperate with the rod 80. A vertically disposed arm 85 is bent upward from the forward end portion of the arm 84, said arm 85 terminating at its upper end in a horizontally disposed pointed part 86, which part is the pointer proper and coöperates with a novel indicating device or scale member which preferably replaces the usual carriage scale and which will now be described, reference being had more particularly to Figs. 1, 11, 11ª, 12, 14 and 15. The indicating devices comprise an actuating bar 87 which is slidable upon the front bar 17 of the platen frame, said actuating bar being formed with longitudinal slots 87ª which receive headed screws 88, the latter holding the bar 87 on the platen frame but permitting movement of said bar lengthwise of itself and of said platen frame. The actuating or slide bar 87 is provided at its left end with a finger piece or handle 89 by which it may be directly actuated and at its right-hand has secured to it by screws 90 a rearwardly extending horizontally disposed arm 91, said arm being twisted so as to provide a vertical downwardly extending portion 91ª which is slotted as indicated at 91ᵇ (Fig. 15) to embrace the spindle 34. The portion 91ª normally lies close to the hub 36 of the right-hand finger wheel 35 and at its left side is contiguous to a washer 92 surrounding the spindle 34. A coiled spring 93, as best shown in Fig. 14, is compressed between the washer 92 and the right-hand side bar 16 of the platen frame, said spring tending to maintain the arm 91 and the bar 87 in the positions shown in Fig. 11. The bar 87 supports two upstanding headed shoulder screws 93. The shouldered portions of these screws coöperate with diagonal slots 94 formed in a scale plate 95, said scale plate being slidably supported on the bar 87 and confined between the top surface of the latter and the under side of the heads of the screws 93. The normal position of the scale plate 95 on the bar 87 may be varied by a setting member 96, best shown in Figs. 11 and 11ª. Said member is in the form of a plate which is formed with a slot 97 receiving the shank of a headed screw 98, said screw entering a threaded opening in the head of the right-hand screw 88, the construction being such that by loosening the screw 98 the setting member or plate 96 may be shifted lengthwise of the scale plate 95. At its left hand portion the plate 96 is provided with a downwardly extending pin 99 which engages in a slot 100 formed crosswise of the scale plate 95 near its right-hand end. It will be obvious that by shifting the setting member 96 the normal position of the scale plate will be altered with respect to the platen and the pointer 86, while at the same time the pin and slot connection between the scale plate and the setting member permits said scale plate to be moved toward and away from the platen whatever the normal position of said scale plate. The scale plate, as clearly appears in Fig. 11, is formed with a double scale, one set of scale marks being at the rear side of the scale plate and the other set at the front side thereof, the front scale marks coöperating with the pointer 86 and the rear scale marks directly with the work sheet on the platen. From the construction just described it will be apparent that when the actuating or slide bar 87 is shifted endwise toward the left the screws 93 will coöperate with the diagonal slots 94 in the scale plate and force the scale plate bodily rearward toward the platen, longitudinal motion of said scale plate being prevented by the pin 99 and slot 100. This rearward movement of the scale plate may be effected by pressing the finger piece 89 toward the left, or is automatically effected when the right-hand platen finger wheel 35 is pressed inward to operate the platen releasing devices. When the finger wheel is pressed inward for this purpose the hub 36 thereof acts against the portion 91ª of the arm 91 to press said arm toward the left with the result that the bar 87 is slid leftward and the screws 93 on said bar co-act with the slots 94 in the scale plate as has been described to force the scale plate rearward toward the platen. Obviously the scale plate will be maintained in its rear position as long as the finger wheel 35 is kept pressed in, and this whether or not the finger wheel be turned at this time to rotate the platen independently of the line space wheel 38. On releasing the finger wheel the spring 93 will restore the slide bar 87 and the scale plate 95 to normal position. This spring 93, of course, also restores the parts to normal position if they have been operated by the finger piece 89.

Normally the scale plate 95 is some distance from the platen, as shown clearly in Figs. 11 and 12, and so that its front edge is close to the end of the pointer 86. The pointer and scale coöperate to afford an easy reading of the latter. The pointer is maintained in its coöperative position by pressure of the rod 80 on the rear curved portion of the arm 84. When the platen frame or carrier is raised for any purpose the rod 80 separates from the arm 84 of the pointer or indicating member and allows the latter to rock back to the inoperative position shown by the dotted lines in Fig. 12. The parts are constructed so that this pivotal movement of the indicating member or pointer to inoperative position will be effected by gravity but in order to quicken the initial stage of the movement I prefer to provide a leaf spring 84ª which is suitably secured to the pointer and coöperates at its free end with the shift rail 20 for the purpose specified. This spring also acts as a stop to prevent the pointer from moving too far toward the rear when the platen frame is in normal position. The pointer or indicating member is pivotally mounted and caused to move in the described manner in order that it may not interfere with the parts mounted at the front of the platen carrier (i. e., the block, roller 19 and yoke plate 78) when the platen carrier is raised.

The novel platen rotating indicating and paper feeding devices hereinbefore described, while they may be used separately or in any desired manner, are primarily intended to be employed in connection with carbon roll mechanism now to be described.

The roll of carbon paper or other transfer medium is mounted on a frame which is vertically disposed, rising above the platen and supported in part on arms 101 (Figs. 1, 2, 11 and 12), said arms being generally triangular in shape and horizontally disposed, their forward end portions being perforated to fit over the outer ends of the screw pivots 10 and being clamped between the side bars 9 of the carriage truck and the locking nuts 11. The arms 101 are provided each with an inwardly extending lug or pin 102 which is adapted to rest or be seated on the top of the carriage truck 7 at the end of the latter. Each arm 101 pivotally supports one of the side arms of the carbon roll frame, said side arm being preferably in the form of a rod 103 made hollow for stiffness and lightness and which at its lower end is suitably secured to a solid block 104 which is slotted to fit over the end of the associate arm 101 and is pivoted thereto at 105 (Fig. 2). Each rod 103 is provided near each of its ends with a strap 106 which is connected at 107 with one end of a hollow rod or brace 108, these rods being arranged diagonally or inclined toward the middle of the frame of which they form a part and each of said rods being connected at 109 to a central member, coupling or tie piece 110. There are four of the tie rods of the character just described and in addition I prefer to provide another stiffening rod 111 connected at 112 to the tie piece 110 and thence extending substantially vertically downward to a screw member or support 113, the latter screwing into the arm 7ª of the carriage truck and the rod 111 being pivotally connected with the member 113 at 114. Each frame rod 103 is provided at its upper end with a suitably secured solid end piece 115 which is slotted to receive a plate-like arm or frame piece 116, the latter being connected with the associate end piece 115 by a screw 117. Below the end piece 115 each frame rod 103 is provided with a strap 118, the end portions of which embrace the lower part of the associate rod 116. A cross rod or support 119 (Fig. 7) extends from one strap 118 to the other, said rod being formed with reduced and threaded end portions 120 which portions pass through perforations in the straps 118 and arms 116. A nut 121 is threaded on each end portion 120 and serves to clamp the ends of the strap 118 and the arm 120 between said nut 121 and the end of the body portion of the rod 119. The rod 119 serves as a frame rod and also as a support for a carbon roll device presently to be described.

By means of the construction just described the frame is rendered rigid at its upper end portion and the arms 116 are rigidly connected to said frame. This frame may, for convenience of description, be termed the main supporting frame for the carbon rolls. In addition to the main supporting frame I provide what may be termed an auxiliary frame which is pivotally connected to the main carbon roll frame at the top and to the platen frame at the bottom. This auxiliary frame comprises hollow side arms or rods 122 each provided at its upper end with a solid end piece 123 which is slotted to embrace the associate arm 116 and is pivotally connected to said arm by a screw pivot 124. At its lower end each auxiliary frame rod 122 is provided with an end piece 125 slotted to receive the upper end portion of an arm or bracket secured to the platen frame. The right-hand arm or bracket 126 is triangular in shape and is secured by screws 127 to the right-hand side or end bar 16 of the platen frame. A screw pivot 128 arranged directly above the axis of the platen connects the right-hand rod 122 with the arm 126. The left-hand arm or bracket 129 is angled, having a vertical part and a horizontal part, the latter being seated on the top of the left-hand side bar 16 and being provided with a slot 130 (Fig. 11), said slot receiving headed screws 131 by which the bracket 129 is secured to the platen frame. A pivot screw 132, directly above the platen axis, pivotally connects the left-hand rod 122 with its bracket 129. This bracket 129 is secured to the top of the platen frame in the described manner in order not to interfere with the usual release key of the machine (not shown).

Referring now more especially to the carbon roll devices proper, these are best illustrated in Figs. 1, 7, 8, 9 and 10. The upper end portion of the left-hand arm or plate 116 is perforated to receive the reduced end portion 133 of a shaft or axle 134, the body of the shaft and the reduced end portion forming at their junction a shoulder which is adapted to abut against the inner face of the left-hand arm 116. The shaft 134 extends horizontally between the arms 116, passing through a bearing opening in the right-hand arm 116 and projecting beyond said arm, the outer end portion of the shaft being threaded as indicated at 135 to receive the collar portion 136 of a crank or finger piece 137, said collar portion being formed with an interiorly threaded opening which engages the threaded part of the shaft 134 and thus connects the shaft and the crank. A collar 138 is adapted to be fixed to the shaft 134 by a set screw 139, said collar abutting against the inner face of the right-hand arm 116 and coöperating with the shoulder at the left end of the shaft 134 to prevent endwise movement of said shaft in its bearings while at the same time permitting rotation of said shaft. A rotary material carrying device or roll holder is supported and secured to the shaft 134, said roll holder in the present instance being in the form of a metallic tube, drum or spool 140 open at the left-hand end and closed at the right-hand end by an end portion 141, the latter projecting outwardly beyond the surface of the roll holder or tube 140 so as to provide a flange 142. The hub 143 of the roll holder extends rightwardly and centrally from the end portion 141, said hub being perforated to permit of the passage of the shaft 134 to which said hub is secured by a set screw 144.

A metallic strip 145 extends longitudinally of the roll holder 140 and is suitably secured at its ends to said roll holder. The strip 145 is so constructed and arranged that an opening or slot-way 146 is formed between it and the surface of the roll holder. The strip 145 serves as an attaching device for the material which is wound upon the roll holder, said material in the present instance being carbon paper and designated by the numeral 147. As shown in Fig. 10 the sides of the carbon paper near one end are cut away or folded so as to form inclined edges 147ª, 1' providing a narrow tongue 147ᵇ which is inserted in or threaded through the opening 146 and serves to frictionally attach the carbon paper to the roll holder. Within the hollow bore of the roll holder 140 a wire spring 148 surrounds the shaft 134. The right-hand end of the spring is secured or hooked in an opening in the end 141 of the roll holder. The left-hand end of the spring is connected by a screw 149 to a rotary member 150 which is in the nature of a head for the left-hand end of the roll holder 140. The member or head 150 is provided with a boss 151 which fits into the bore of the roll holder 140, the periphery of said boss serving as a bearing for the left-hand end of the roll holder. The head 150 is provided with a flange 152 corresponding with the flange 142, the two flanges coöperating to properly guide the carbon paper as it is wound on and off the roll holder. Said head is further provided with a leftwardly extending central hub portion 153 which terminates in a sprocket wheel 154 having sprocket teeth 155. The head 150 is adapted to rotate on and relatively to the shaft 134. Motion of said head lengthwise of said shaft toward the right is prevented by the contact of the flange 152 with the end of the roll holder 140. Motion of the head 150 toward the left along the shaft is prevented by a sleeve 156 which is confined between the right-hand face of the head and a collar 157 which is secured to the shaft 134 by a set screw 158. The head 150 and the roll holder 140 are connected by the spring 148 and caused to operate in a manner which will presently be described. The sprocket wheel 154 of the head 150 coöperates with a sprocket chain, said chain comprising pins 159 which are adapted to engage in the openings between the sprocket teeth 155, the pins 159 being connected by links 160 in the usual or in any suitable manner. The sprocket chain also coöperates with the teeth 161 of a sprocket wheel 162, said sprocket wheel being similar to the sprocket wheel 154 and being integral with a hub 163 which extends leftward from a rotary member or head 164, said head being supported by and adapted to rotate on the rod 119. The two sprocket wheels 154 and 162 are so connected by the sprocket chain that rotary movement communicated to one of the heads 150 or 164 will be communicated to a substantially equal extent to the other of said heads. The head 164 is prevented from moving leftward along the rod 119 by a collar 165 which is secured to the rod by a set screw 166, said collar abutting against the left-hand face of the sprocket wheel 162.

The head 164 is provided with a flange 167 and with a boss 168 which fits in the left end of a tubular rotary material-carrying device, roll holder or drum 169, said boss 168 serving as a support and bearing for said roll holder. This roll holder 169, which may be termed the receiving roll holder, is disposed below and close to the delivery roll holder 140 and is similar in construction thereto. The roll holder 169 has a right-hand end portion or head 170 and a flange 171, said head being loosely mounted on the rod 119. A collar 172 secured to the rod 119 by a set screw 173 abuts against the right end of the roll holder 169 and prevents movement of said roll holder rightward along the rod 119. Toward the left, endwise movement of the roll holder 169 is prevented by the flange 167 of the head 164 against which flange the end of the roll holder 169 abuts. The left-hand end of the roll holder, of course, prevents rightward movement of the head 164 along the rod 119. The construction is such that both the roll holder 169 and the head 164 may rotate together or independently of each other on the rod 119, but neither the roll holder nor the head is movable, during the operation of the mechanism, lengthwise of the rod 119. The roll holder 169 and the head 164 are connected by a spring 174, said spring being arranged within the hollow bore of the roll holder 169 and surrounding the rod 119. The right-hand end of the spring 174 is attached to the end portion 170 and the left-hand end of said spring is attached to a threaded member 175 which member screws into the head 164, the spring 174 being wound oppositely to the spring 148. It will be understood that one of the springs 148, 174 may be dispensed with if desired and the associate roll holder may have its left-hand head rigidly secured to said roll holder, the sprocket chain of course being retained to connect the two heads. In such a construction the single spring would act on both roll holders as the two springs do in the construction shown. The single spring would act directly on one roll holder and would act on the other through the sprocket chain. By employing two springs, however, not only is a greater length of spring attained but the advantage is also attained of having a spring connected directly to each roll holder. A metallic strip 176 similar to the strip 145 is arranged lengthwise of the roll holder 169, the ends of said strip being suitably attached to the roll holder. The strip is constructed and arranged to provide an opening or slot-way 177 between the strip and the surface of the roll holder, said strip serving to attach the carbon paper to the roll holder 169 in a manner similar to that above described in connection with said delivery roll holder.

In arranging the carbon paper in place and attaching it to its support, said carbon paper is first attached at one end to the delivery roll holder 140 and then wound thereon in a roll, the crank or handle 137 being useful to facilitate this winding. After being so wound the outer free end of the carbon paper is drawn forward over the roll and led or drawn downward at the front of the platen as shown in Fig. 2, thence under the platen and upward at the rear of the latter and toward the rear side of the receiving roll holder 169. At this time it may be assumed that there is no tension in either of the springs 148 and 174. Prior to attaching the outer end of the carbon paper to the receiving roll holder 169 the operator winds up the two springs or puts them under tension, preferably by grasping the flange 171 and turning it and the roll holder 169 in the direction of the arrow in Fig. 8, while at the same time holding and maintaining the loose or free end of the carbon paper near the roll holder 169. During this turning of the roll holder 169 the roll holder 140 will be prevented from turning because of the fact that the operator is holding the loose end of the carbon paper which is wound upon said roll holder 140. It will be understood that the turning or winding up of the spring 174 will effect a substantially equal turning or winding up of the spring 148. In other words, the tension or turning force of the two opposing springs will be maintained at all times substantially equal. This perhaps will be clear if we follow the operation of winding up the springs in a little greater detail, having reference more especially to Fig. 7. The turning of the flange 171 will turn the right-hand end of the spring 174 attached to said flange. Part of this turning movement will be absorbed in winding the spring 174 and the remainder will be transmitted to the left-hand end of the spring 174 which is attached to the head 164 and will effect a turning movement of said head and of the sprocket wheel 162 integral therewith. The motion of the sprocket wheel 162 will be transmitted through the sprocket chain to the sprocket wheel 154 and to the head 150 integral therewith. The turning of the head 150 effects a turning or winding up of the left-hand end of the spring 148 attached to said head. The right-hand end of the spring 148 is fast to the end of the roll holder 140 which at this time is prevented from moving under the impulse of the spring 148 by the grasp maintained by the operator on the free or loose end of the carbon paper. The construction is such that when the spring 148 is substantially wound up the opposing spring 174 will also be substantially wound up. The operator may then attach the loose or free end of the carbon paper 147 to the roll holder 169, bringing the carbon paper up at the rear of said roll holder and threading the end, which is provided with a tongue similar to the tongue 147b, through the opening or slot-way 177 formed in part by the strip 176. The flanges 167 and 171 coöperate with the carbon paper to cause it to wind and unwind properly on the roll holder 169. From a consideration of Figs. 7, 8 and 9 and from what has been said it will be apparent that the tension or pull of the spring 148 will tend to rewind the carbon paper 147 on the roll holder 140 and that the tension or pull of the spring 174 will tend to wind the opposite end portion of the carbon paper on the roll holder 169 so that the straight portions of the carbon paper between the two roll holders and the platen will be maintained in a taut condition at all times. The pull or force exerted by the two opposing springs is kept at all times substantially the same by the sprocket connection between them and consequently no turning or winding of the carbon paper on either spool will take place except when additional power is applied by the operator to draw the carbon paper in one direction or the other around the platen over or across the printing point thereon, as will presently be described more fully.

The carbon roll devices above described may be made use of in any desired way and provide a ready means of duplicating the copy made by the usual inking ribbon of the machine. These novel devices are particularly adapted for use with a folded work sheet or bill sheet of the character shown in Fig. 1, and one manner of employing the carbon roll devices will be explained in connection with a bill sheet of this character. Said bill sheet is composed of two sections or leaves which for descriptive purposes will be numbered 178$^a$ and 179$^b$, the said leaves being joined at the right-hand edge by a crease or fold 178$^c$. The folded bill sheet is adapted to straddle or fit over the straight portion of the carbon paper 147 between the delivery roll holder and the platen, the front leaf 178$^a$ being in front of the carbon paper and the leaf 178$^b$ behind the carbon paper, the folded edge 178$^c$ being close to the right-hand edge of the carbon paper. In operating the mechanism each folded bill sheet is in turn caused to straddle or fit over the carbon paper in this way, then fed backwardly over and around the platen until the first writing line is reached and then written upon and advanced line by line in line spacing direction.

To facilitate the backward feeding of the bill sheet and cause it to be properly guided during the backward feeding movement, I preferably provide a supporting device or table which is shown clearly in Figs. 1, 2, 3 and 4. The table, designated by the numeral 179, is in the form of an oblong plate substantially vertically arranged between the two straight portions of the carbon paper and substantially parallel therewith, said table being pivotally supported on the supplementary frame of the carbon roll device as will now be described.

Angled brackets 180 are secured in pairs at the rear of the table 179 in any suitable way as by screws 181. Said brackets are provided with ears 180$^a$ which are perforated to provide bearing openings for parallel bearing rods 182. Fast to the upper rod 182 near each end thereof and between the ears 180$^a$ arms or links 183 normally extend downward and are fixed at their lower ends to a sleeve 184. Said sleeve surrounds and bears on a rod 185, said rod being threaded at its ends to receive nuts 186 by which the rod is attached to clamps 187 fast on the side rods 122 of the auxiliary frame. Between the lower pair of ears 180$^a$ and fast on the lower rod 182 near its ends are angular members each comprising an arm 188 normally extending downward and an arm 189 normally extending rearward. The arms 188 are fixed at their lower ends to a sleeve 190 which surrounds a supporting rod 191, said supporting rod being threaded at its ends to receive nuts 192 by which the rod is held in fixed relation with clamps 193 clamped on the frame rods 122. Collars 194 fixed to the rod 191 by set screws 195 abut against the ends of the sleeve 190 and serve to prevent bodily sidewise movement of the table 179. Finger pieces 196 are secured to the ends of the rod 182 and project beyond the side edges of the table 179, said finger pieces serving as means for conveniently manipulating the table 179. The normal or inoperative position of this table is shown by full lines in Fig. 4. From a consideration of this figure it will be seen that at this time the table stands some distance behind the forward straight portion of the carbon paper 147 so that the folded bill sheet may be readily slipped over or caused to straddle this portion of the carbon paper without being impeded by the table. When the bill sheet has been thus arranged with its lower edges some distance above the top of the platen, one or another of the finger pieces 196 may be grasped and the paper table 179 may be swung forward to the position indicated by dotted lines in Fig. 4 and by full lines in Fig. 2. The forward movement of the table will be arrested by the engagement of the ends or noses of the arms 189 with the back of said table. When arrested, as will be seen clearly from a consideration of Fig. 2, the table will lie against the rear leaf of the folded bill sheet and will be nearly tangential of the platen, the lower edge of the table being at this time but a short distance above the platen. The table when thus positioned will guide the folded bill sheet smoothly and evenly over the platen as said folded bill sheet is fed backwardly through the machine, will assist to prevent rumpling or improper creasing of said bill sheet during this backward feeding movement and will hold the rear leaf of the folded bill sheet forward and guide it down over the front of the platen. The plate 179 is held by gravity in either of its two positions. As shown in Fig. 4, the links 188 when in full line position are inclined backward from the rod 191 which supports them, and when in dotted line position said links extend forward from said rod. The links 188 are prevented from passing the dead center position by contacting with parts of the brackets 180, as shown in Fig. 4.

Assuming that the folded bill sheet has been arranged to embrace or straddle the forward straight portion of the carbon paper, said bill sheet is next fed backwardly preferably by operating the right-hand finger wheel 35, said finger wheel being first pressed inwardly to release or disconnect the platen from its step-by-step line spacing devices, i. e., the ratchet wheel 38 and the cooperating detent 50. It will be recalled that operation of the platen releasing mechanism automatically moves the indicating device or scale plate 95 rearward. This rearward movement will continue until the rear scale on said plate is in juxtaposition to the front leaf 178$^a$ of the folded work sheet and so may be conveniently read in connection with the front leaf to position the latter and the work sheet as a whole both widthwise and lengthwise. When the platen has been turned in the reverse direction by the finger wheel 35 far enough to bring the first line which is to receive the type impression opposite to the scale plate 95, the finger wheel 35 may be released, thereby permitting the platen to be reconnected with the ratchet wheels 38 and 53 and the scale plate to return to normal position. It will be noted that the indicating device or scale plate 95 when used as just explained, serves both as a scale and as a line finder, operating in the latter capacity to facilitate the bringing of a predetermined line to a predetermined position with respect to the platen. The operator next grasps the handle 58 and pulls it forward from the normal position shown in full lines in Fig. 15 to the dotted line position in said figure. This movement of the handle 58 causes the pawl 57 to cooperate with the teeth of the ratchet wheel 53 to effect a continuous rotation or turning movement of the platen in the reverse direction to the extent of eleven teeth or eleven line space distances, which in the present case is just far enough to bring the desired printing line from the point where it cooperated with the scale 95 to the printing position at the under side of the platen where it will be adapted to receive impressions from the usual or suitable printing instrumentalities (not shown). It will be understood that these printing instrumentalities will cause type impressions to be made on the outer leaf 178$^a$ of the bill sheet through the usual or a suitable inking ribbon (not shown) and that these type impressions will be duplicated through the carbon paper 147 on the under leaf 178$^b$ of the folded work sheet. After the first line or item has been written and duplicated in this manner the work sheet may be line spaced by operating the usual line space lever 51, and then the printing and linespacing operations may be continued until the entries on the folded bill sheet have been completed and the latter moved forward out of the machine until it again rests on the table 179 whence it may be removed. These operations may be repeated with one or any number of subsequent bill sheets.

For writing paper of the ordinary thickness the feed roller 72 is maintained in the released or inoperative position as shown in Fig. 12 and the movements of the folded bill sheet back and forth over the platen are effected by the coöperation of the carbon paper 147 with the platen. The carbon paper is drawn comparatively tight against the platen by the opposing springs inside the roll holders and when the bill sheet is guided downwardly until its rear leaf 178$^b$ is caught in the bite between the platen and the carbon paper, the friction will be sufficient thereafter to feed the work sheet backwardly until printing position is reached and thence forwardly again until the work sheet is fed out of the machine. When, however, thin writing paper is used the feed roller 72 may be brought into operation with advantage. It is not thought necessary to explain in detail the operation of the feed roller 72, the apron or guide 65, paper fingers 62 and the central stationary guide 63. These several devices operate or may operate like the corresponding devices on the Remington machine, the only difference being that in the present case the operation is in reverse order to the usual operation.

It will be understood that during the backward and forward rotary movements of the platen the roll holders will turn also and the carbon paper will be drawn off one of said rollers and wound on the other one of said rollers, the straight portions of the carbon paper, or those portions between the roll holder and the platen being, however, always maintained in a taut and smooth condition so that the type impressions made from the carbon paper will always be clear and the danger of smutting or "treeing" minimized. It will also be understood that when a succession of bill sheets are introduced in the machine one after the other and fed backward and forward and written upon, the same portion or section of the carbon paper will be used in transferring impressions to the rear leaf 178$^b$ of each of these bill sheets, this being so because the carbon paper is first fed from the delivery roll holder to the receiving roll holder as each bill sheet is being fed backwardly through the machine, and then said carbon paper is re-fed to substantially the same extent from the receiving roll holder to the delivery roll holder as said work sheet is being fed in line spacing direction. When a section or portion of the carbon paper used in this way has become exhausted or used to such an extent that impressions from it are no longer clear and distinct a new or fresh section or portion of the carbon paper may be brought into operation by turning the platen backward when no work sheet is in the machine so as to cause the winding up on the receiving roll holder of a portion or section of the carbon paper equal substantially in area to the exhausted portion or section. At first the delivery roll holder is comparatively full and the receiving roll holder almost empty as shown in Figs. 7 and 9. With the roll holders in this condition it will be evident that because of the larger diameter of the roll or carbon paper on the upper or delivery roll, the latter will receive a less extent of rotary movement when a new section of the carbon paper is unwound from it than will the receiving roll holder in winding up an equal amount of carbon paper. Nevertheless, the opposing springs will maintain the straight portions of the carbon paper in taut condition. This difference in extent of rotary movement of the two roll holders will lessen, of course, as the amount of carbon paper on each roll holder approaches equality. When the amounts on the two rolls are substantially equal the extent of turning movement of the two rolls will be substantially equal, and when the exhausted carbon paper wound on the receiving roll holder is greater in diameter than the remaining portion on the delivery roll holder the conditions first above described will of course be reversed. It will be understood that because of the unequal turning movements of the two roll holders the springs within them will run down when the receiving roll holder is turning more rapidly than the delivery roll holder and care must be taken to provide springs which may be wound up enough to retain sufficient tension to maintain the carbon paper in a taut condition when the rolls of paper or other material on the roll holders are substantially equal in diameter. In case the carbon paper was originally rolled somewhat loosely on the delivery roll the springs will nevertheless keep the paper taut and wind it more tightly. These may be called take-up or compensating springs.

From what has been said it will be seen that the construction provides material-carrying devices or roll holders arranged at the same side of the platen and combined with means tending to move them oppositely, (i. e., in opposition one to the other), the means in the present case being opposing turning springs. Equalizing means are also provided for maintaining the springs or moving means in equilibrium, the equalizing means including the sprocket wheels and chain. From another point of view the sprocket wheels and chain may be regarded as comprised in a take-up device forming part of the connection between the roll holders whereby each of them is adapted to take up slack from the other when the paper or other material which runs from one of the roll holders to the other is fed between said roll holders.

The Remington machine to which my invention is shown as applied is of the swinging platen class, the plates being mounted in a platen frame or carrier which is in turn pivotally and slidably mounted on a carriage truck. The platen frame may be moved to and fro on the truck to change case by operating one of the usual shift keys (not shown) during which movements the relation between the platen and the two roll holders will be only slightly altered. The roll holder springs 148 and 174 will operate to keep the straight portions of the carbon paper taut during platen shifting movements and the friction between the platen and the carbon paper and the bill sheet or work sheet will maintain the platen and the printing line on the paper in unaltered relation during such shifting movements. This feature of the invention will be discussed more in detail in connection with the lifting or upward swinging movements of the platen and platen carrier or frame. When it is desired to expose the writing line at the under side of the platen for inspection, correction or any other purpose, the platen frame may be swung upward and rearward by the usual lifting handle 197 from normal position to the position illustrated in Figs. 5 and 6. The platen and platen frame will be arrested and held in this abnormal position by the usual stop devices, said stop devices being clearly illustrated in Figs. 6, 11 and 12 and comprising a block 14ª fast on the bar 14 of the platen frame, said block being adapted to coact with the forward edge of a tongue piece 198, the latter being secured by a screw 199 to a slide plate 200, said slide plate at its forward end portion being hooked around the bar 14 and at its rear being formed with a slot 201 which coöperates with a guiding and limiting screw 202 fixed in the arm 7ª of the carriage truck. The slide plate 200 is normally positioned so that it engages with the under side of the head of the screw 202 but when the platen and platen frame are lifted and swung back to the position shown in Figs. 5 and 6, the slide plate 200 will engage with the arm 7ª as shown in Fig. 6. Rearward movement of the plate 200 is thus prevented and consequently the forward end of the tongue 198 will coöperate with the block 14ᵃ to arrest the platen and platen frame in the position shown in Figs. 5 and 6. From a consideration of Figs. 2 and 5 it will be apparent that during this rearward swinging movement of the platen the carbon roll devices and their supporting frames, both the main and auxiliary, will also be swung backward. The main frame during this operation will fulcrum or pivot on the pivot screws 105 while the auxiliary frame will fulcrum on the pivot screws 124. There will also be a relative pivotal movement on the pivot screw 128 between the right-hand arm 122 of the auxiliary frame and the bracket 126 fast on the platen frame and also a corresponding pivotal movement on the pivot screw 132 between the left-hand arm 122 and the bracket 129. During this movement of the platen from normal to abnormal position the printing point will approach the delivery roll holder and will move farther from the receiving roll holder. The springs within the roll holders, however, do not overcome the friction between the platen and the carbon paper and folded work sheet and consequently there will be no movement of the carbon paper or work sheet at the printing point but the delivery roll holder will turn to take up the slack in the forward straight portion of the carbon paper, and the receiving roll holder yield or turn so that the carbon paper may be unwound from it to allow for the increase in the distance between the receiving roll holder and the printing point on the platen. During the return of the platen and platen carrier and the carbon roll devices and their supporting frames from abnormal to normal position, the relation between the platen and the printing point on the carbon paper and work sheet will remain unchanged. It will be seen therefore that the construction is such that the swinging movements of the platen and platen frame or carrier are not interfered with while at the same time these swinging movements do not affect the relation between the platen and the printing portion of the work sheet and carbon paper, nor occasion any looseness in said carbon paper.

Various changes may be made without departing from the scope of my invention.

What I claim as new and desire to secure by Letters Patent, is:—

1. In a typewriting machine, the combination of two material-carrying devices, and means tending constantly to move both said devices each in opposition to the other.

2. In a typewriting machine, the combination of two rotary material-carrying devices, and means tending constantly to turn both said devices to wind the material thereon.

3. In a typewriting machine, the combination with a platen, of two material-carrying devices arranged at the same side of the platen, and means constantly operating to maintain in a taut condition the entire length of the material which runs from one device around the platen to the other device.

4. In a typewriting machine, the combination with a platen, of two material-carrying devices arranged at the same side of the platen, and means tending constantly to move both said devices each oppositely to the other so that the entire length of the material which runs from one of said devices around the platen to the other device is maintained in a taut condition.

5. In a typewriting machine, the combination with a platen, of two rotary material-carrying devices, and means tending constantly to turn both said devices in opposition to each other, the material passing from one device to the other over the platen.

6. In a typewriting machine, the combination with a platen, of two rotary material-carrying devices arranged at the same side of the platen, and means tending constantly to turn both said devices and maintaining in a taut condition the paper or other material carried by said devices, said material passing from one of said devices around the platen to the other device.

7. In a typewriting machine, the combination with a platen, of two material-carrying devices arranged above the platen, and means tending constantly to move both said devices in opposition to each other and to maintain in a taut condition the paper or other material attached to said devices, said material passing from one device down in front of the platen thence under the platen and upward at the rear thereof to the other device.

8. In a typewriting machine, the combination with a platen carriage and a platen mounted thereon, of a support on said carriage, two material-carrying devices on said support, and means tending constantly to move both said devices in opposition to each other, the paper or other material carried by said devices passing from one of said devices over the platen to the other device.

9. In a typewriting machine, the combination with a platen carriage, and a platen mounted thereon, of a support on said carriage, two material-carrying devices on said support and arranged at the same side of the platen, and means tending constantly to move both said devices to maintain in a taut condition the paper or other material carried by said devices, said material passing from one device around the platen to the other device and being secured to said devices.

10. In a typewriting machine, the combination with a platen carriage and a platen mounted thereon, of a support on said carriage, two rotary material-carrying devices on said support, and means tending constantly to rotate both said devices in opposite directions, the material passing from one of said devices over the platen to the other device.

11. In a typewriting machine, the combination with a platen carriage and a platen mounted thereon, of a support on said carriage, two rotary material-carrying devices mounted on said support at the same side of the platen, and means tending constantly to turn both said devices in opposition to each other and to maintain in a taut condition the paper or other material carried by said devices, said material passing from one device over and around the platen to the other device.

12. In a typewriting machine, the combination of a platen, two material-carrying devices carrying paper or other material which passes over the platen from one device to the other, means tending constantly to move both said devices in opposition to each other, and means for moving the platen for line spacing and feeding the material from one device to the other in line spacing direction.

13. In a typewriting machine, the combination with a platen, of two rotary material-carrying devices, the material carried by said devices passing from one device to the other over the platen, means tending constantly to turn both said devices in opposition to each other, and means for line spacing the platen and turning the devices to feed the material from one to the other.

14. In a typewriting machine, the combination with a rotary platen, of two rotary material-carrying devices, means tending constantly to turn both said devices in opposite directions, and means for rotating the platen for line spacing and feeding the material carried by said devices from one to the other, said devices turning in the same direction during line spacing movements of the platen and one only of said devices turning in opposition to said first recited means.

15. In a typewriting machine, the combination with a platen, of two rotary material-carrying devices arranged at the same side of the platen, means tending constantly to turn both said devices in opposition to each other and maintaining in a taut condition the paper or other material carried by said devices, said material passing from one of said devices around the platen to the other device, and means for line spacing the platen and turning said devices to feed the material from one to the other.

16. In a typewriting machine, the combination with a platen, of two rotary material-carrying devices arranged at the same side of the platen, means tending constantly to turn both said devices in opposition to each other and maintaining in a taut condition the paper or other material carried by said devices, said material passing from one of said devices around the platen to the other device, and means for turning said platen back and forth in opposite directions and feeding the material back and forth from one device to the other.

17. In a typewriting machine, the combination with a platen, of two rotary material-carrying devices arranged at the same side of the platen, means tending constantly to move both said devices each in opposition to the other and maintaining in a taut condition the paper or other material carried by said devices, said material passing from one of said devices around the platen to the other device, and means for turning said platen back and forth in opposite directions and feeding the material back and forth from one device to the other, said last recited means comprising two sets of platen rotating devices.

18. In a typewriting machine, the combination with a platen, of two rotary material-carrying devices arranged at the same side of the platen, means tending constantly to turn both said devices each in opposition to the other and maintaining in a taut condition the paper or other material carried by said devices, said material passing from one of said devices around the platen to the other device, and means for turning said platen back and forth in opposite directions and feeding the material back and forth from one device to the other, said last recited means comprising two separately operative pawl-and-ratchet mechanisms.

19. In a typewriting machine, the combination of a rotary platen, a line spacing ratchet wheel operatively connected with said platen, a hand-controlled pawl coöperative with said ratchet wheel to turn said platen in one direction for line spacing, a second ratchet wheel operatively connected with said platen, and a device coöperative with said second ratchet wheel to turn the platen in the opposite direction, said device comprising an annulus and a hand-controlled lever pivoted on said annulus, one arm of said lever constituting a pawl, said lever having on its other arm a finger piece which is operative to turn said annulus and said platen.

20. In a typewriting machine, the combination of a rotary platen, a line spacing ratchet wheel operatively connected with said platen, a hand-controlled pawl coöperative with said ratchet wheel to turn said platen in one direction for line spacing, a second ratchet wheel operatively connected with said platen, and a device coöperative with said second ratchet wheel to turn the platen in the opposite direction, said device comprising an annulus and a hand-controlled lever pivoted on said annulus, one arm of said lever constituting a pawl, said lever having on its other arm a finger piece which is operative to turn said annulus and said platen, said annulus being loosely arranged at one end of the platen and being adapted to turn co-axially with the platen.

21. In a typewriting machine, the combination of a rotary platen, a ratchet wheel operatively connected therewith, and a device coöperative with said ratchet wheel to turn said platen, said device comprising an annulus loosely arranged at one end of the platen and adapted to turn co-axially therewith and a hand-controlled lever pivoted to said annulus, one arm of said lever constituting a pawl coöperative with said ratchet wheel to effect continuous turning movements of said platen to a predetermined extent, the other arm of said lever constituting a finger piece rigid with the pawl to actuate said ratchet wheel annulus and platen.

22. In a typewriting machine, the combination with a rotary platen, and two material carrying devices, of means independent of the platen and associated with said devices to enable each of them to take up slack from the other, said means operating on both said devices normally and also during movements of the platen in opposite directions.

23. In a typewriting machine, the combination of a platen, two roll holders arranged so that the paper or other material carried by said roll holders runs from one to the other over the printing point on the platen, means for feeding the paper or other material between the roll holders, and a connection between the roll holders including a take-up device, said connection being independent of the paper or other material carried by said roll holders.

24. In a typewriting machine, the combination of a rotary platen, a pair of roll holders carrying paper or other material which passes from one roll holder to the other partly around the platen, line spacing devices for turning the platen and feeding the paper between the roll holders, and a connection between the roll holders, said connection including a take-up device operative to keep the paper or other material in a taut condition between the platen and both said roll holders.

25. In a typewriting machine, the combination of a material-carrying device, moving means tending to move it in one direction, a second material-carrying device, moving means tending to move said second device in the opposite direction to the first device, and means tending to maintain the two said moving means in equilibrium.

26. In a typewriting machine, the combination of a rotary material-carrying device, turning means tending to turn said device in one direction, a second rotary material-carrying device, turning means tending to turn said device oppositely to the first device, and means tending to maintain the two said turning means in equilibrium.

27. In a typewriting machine, the combination with a platen, of a rotary material-carrying device, turning means tending to turn said device in one direction, a second rotary material-carrying device arranged at the same side of the platen as the first device, turning means tending to turn said second device oppositely to the first device, and means tending to maintain the two said turning means in equilibrium, the material which passes from one device to the other partially around the platen being maintained in a taut condition.

28. In a typewriting machine, the combination of two rotary material-carrying devices, a spring tending to turn one device in one direction, a second spring tending to turn the other device in the opposite direction, and means connecting said springs and tending to maintain them in equilibrium.

29. In a typewriting machine, the combination of two rotary material-carrying devices and spring means connected with both said devices independently of the material carried thereby and tending constantly to turn them in opposition to each other.

30. In a typewriting machine, the combination of two rotary-material-carrying devices, a spring tending to turn one device in one direction, and a second spring tending to turn the other device oppositely.

31. In a typewriting machine, the combination with a platen, of two rotary material-carrying devices, a spring tending to turn one device in one direction, and a second spring tending to turn the other device in the opposite direction, the material passing from one device to the other over the platen.

32. In a typewriting machine, the combination with a platen, of two rotary roll holders, a spring connected to one roll holder, a second spring connected to the other roll holder, a rotary member connected with the first named spring, a second rotary member connected with said second spring, and means connecting said rotary members.

33. In a typewriting machine, the combination with a platen, of two rotary roll holders, a spring connected with one roll holder and tending to turn it in one direction, a rotary member connected with said spring, a second spring connected with the other roll holder and tending to turn it oppositely to the first roll holder, a second rotary member connected with said second spring, and means connecting said rotary members and controlling the turning movements of said rotary members.

34. In a typewriting machine, the combination with a platen, of two rotary roll holders, a spring connected with one roll holder and tending to turn it in one direction, a rotary member connected with said spring, a second spring connected with the other roll holder and tending to turn it oppositely to the first roll holder, a second rotary member connected with said second spring, and means connecting said rotary members and controlling the turning movements of said rotary members, the paper or other material carried by said roll holders being attached thereto at its ends and passing from one roll holder partially around the platen to the other roll holder.

35. In a typewriting machine, the combination with a platen, of two rotary roll holders, a spring connected with one roll holder and tending to turn it in one direction, a rotary member connected with said spring, a second spring connected with the other roll holder and tending to turn it oppositely to the first roll holder, a second rotary member connected with said second spring, sprocket wheels rigid with said rotary members, and a sprocket chain connecting said sprocket wheels.

36. In a typewriting machine, the combination with a platen, of a rotary roll holder, a coiled spring within said roll holder, said spring being secured at one end to said roll holder and tending to turn it in one direction, a rotary member connected with the other end of said coiled spring, a second rotary roll holder, a second coiled spring within said second roll holder and attached at one end thereto, a second rotary member connected with the other end of said second coiled spring, said second coiled spring tending to turn said second roll holder oppositely to the first roll holder, and means connecting said rotary members.

37. In a typewriting machine, the combination with a platen, of a rotary roll holder, a coiled spring within said roll holder, said spring being secured at one end to said roll holder and tending to turn it in one direction, a rotary member connected with the other end of said coiled spring, a second rotary roll holder, a second coiled spring within said second roll holder and attached at one end thereto, a second rotary member connected with the other end of said second coiled spring, said second coiled spring tending to turn said second roll holder oppositely to the first roll holder, and means connecting said rotary members and tending to equalize the turning forces of said springs, the paper or other material carried by said roll holders passing from one to the other partially around the platen.

38. In a typewriting machine, the combination with a platen; of a hollow rotary roll holder; a spring coiled within said roll holder and connected therewith; a separately rotatable head at one end of said roll holder and connected with said coiled spring, said head comprising a sprocket wheel; a second hollow rotary roll holder; a second spring coiled within said second roll holder and connected therewith; a head at one end of said second roll holder and rotatable independently thereof, the last recited head being connected with said second spring and comprising a sprocket wheel; and a sprocket chain connecting said sprocket wheels.

39. In a typewriting machine, the combination with a platen, of a supporting frame, a rod or shaft on said frame, a hollow delivery roll holder on said rod or shaft, a spring coiled within said roll holder and connected thereto, a head rotatable on said rod or shaft and connected with said roll holder by said spring, a second rod or shaft on said frame, a hollow receiving roll holder on said rod or shaft, a spring coiled within said receiving roll holder and connected thereto, a head rotatable on said second rod or shaft and connected with said receiving roll holder by said second spring, and means connecting said heads.

40. In a typewriting machine, the combination with a platen, of a supporting frame, a rod or shaft on said frame, a hollow delivery roll holder on said rod or shaft, a spring coiled within said roll holder and connected thereto, a head rotatable on said rod or shaft and connected with said roll holder by said spring, a second rod or shaft on said frame, a hollow receiving roll holder on said rod or shaft, a spring coiled within said receiving roll holder and connected thereto, a head rotatable on said second rod or shaft and connected with said receiving roll holder by said second spring, sprocket wheels, one rigidly connected with each of said heads, and a sprocket chain connecting said sprocket wheels.

41. In a typewriting machine, the combination with a platen, of a supporting frame, a shaft journaled thereon and provided with a turning handle, a hollow delivery roll holder fixed to said shaft, a spring coiled within said roll holder and attached thereto, a head loosely mounted on said shaft and connected with said spring, said head being provided with a sprocket wheel, a rod fixed to said supporting frame, a hollow receiving roll holder journaled on said rod, a second spring within said receiving roll holder and tending to turn it oppositely to the delivery roll holder, a head loosely mounted on said rod and connected with said second spring, the last named head being provided with a sprocket wheel, and a sprocket chain connecting said sprocket wheels.

42. In a typewriting machine, the combination with a platen, of a supporting frame, a shaft journaled thereon and provided with a turning handle, a hollow delivery roll holder fixed to said shaft, a spring coiled within said roll holder and attached thereto, a head loosely mounted on said shaft and connected with said spring, said head being provided with a sprocket-wheel, a rod fixed to said supporting frame, a hollow receiving roll holder journaled on said rod, a second spring within said receiving roll holder and tending to turn it oppositely to the delivery roll holder, a head loosely mounted on said rod and connected with said second spring, the last named head being provided with a sprocket wheel, and a sprocket chain connecting said sprocket wheels, the paper or other material being attached at its ends to said roll holders and passing from one to the other partially around said platen.

43. In a typewriting machine, the combination with a platen and platen carriage, of a carbon roll support, said support comprising a frame consisting of side bars or rods, a cross bar and diagonally arranged tie rods connected with a central tie piece, said side bars and tie rods being hollow and provided with solid end pieces by which they are connected with associate parts.

44. In a typewriting machine, the combination with a platen, line spacing devices normally connected therewith, and means for disconnecting the platen from said devices, of a line indicating device, and means for automatically moving said indicating device when the first named means is operated.

45. In a typewriting machine, the combination of a platen, line spacing devices normally connected with said platen, means for disconnecting the platen from said devices, an indicating device normally removed from the platen, and means for automatically moving said indicating device toward the platen when the first named means is operated.

46. In a typewriting machine, the combination of a platen, line spacing devices normally connected with said platen, means for disconnecting the platen from said devices, a line-finder extending lengthwise of the platen and normally removed therefrom, and means for automatically moving said line-finder toward the platen when the first named means is operated.

47. In a typewriting machine, the combination of a platen, line spacing devices normally connected with said platen, means for disconnecting the platen from said devices, a scale normally removed from the platen, and means for automatically moving said scale toward the platen when the first recited means is operated.

48. In a typewriting machine, the combination of a platen, line spacing devices normally connected with said platen, means for disconnecting the platen from said devices, a combined letter-space scale and line-finder normally removed from the platen, and means for automatically moving said combined scale and line-finder toward the platen when said first recited means is operated.

49. In a typewriting machine, the combination of a platen carriage, a platen thereon, step-by-step line spacing devices normally connected with said platen, means for disconnecting said platen from said line-spacing devices, an indicating device slidable on said platen carriage toward and away from the platen, and means for automatically moving said indicating device when the first recited means is operated.

50. In a typewriting machine, the combination of a platen carrier, a platen thereon, a line spacing ratchet wheel normally connected with the platen, means for disconnecting the platen from said line spacing wheel, an indicating device slidable toward and away from the platen on said platen carrier, and means connecting said indicating device with the first recited means.

51. In a typewriting machine, the combination of a platen carrier, a platen provided with a finger wheel, a line spacing ratchet wheel normally connected with said platen, means operative by the platen finger wheel to disconnect the platen from said wheel, an indicating plate slidable on said platen frame, and means operated by said finger wheel for moving said indicating plate.

52. In a typewriting machine, the combination of a platen carrier, a platen provided with a finger wheel, a line spacing ratchet wheel normally connected with said platen, means operative by the platen finger wheel to disconnect the platen from said ratchet wheel, an indicating plate slidably mounted on said platen carrier, an actuating bar operated by said platen finger wheel, and connections between said actuating bar and said indicating plate.

53. In a typewriting machine, the combination of a platen carrier, a platen provided with a finger wheel, a line spacing ratchet wheel normally connected with said platen, means operative by the platen finger wheel to disconnect the platen from said ratchet wheel, an indicating plate slidably mounted on said platen carrier, an actuating bar operated by said platen finger wheel, and connections between said actuating bar and said indicating plate, said connections comprising pins and inclined slot-ways.

54. In a typewriting machine, the combination of a platen frame comprising a front bar, a platen rotatable on said frame and provided with a finger wheel, a line spacing ratchet wheel normally connected with said platen, means operative by said finger wheel for disconnecting said platen from said ratchet wheel, an actuating bar slidably mounted on said front bar and operative by said finger wheel, an indicating plate mounted on said actuating bar and extending lengthwise of the platen, said indicating plate being normally removed from the platen, and connections between said indicating plate and said actuating bar for moving said indicating plate toward the platen.

55. In a typewriting machine, the combination of a platen, line spacing devices normally connected with said platen, means for disconnecting the platen from said devices, an indicating device normally removed from the platen, means controlled by said disconnecting means for moving said indicating device toward the platen when said disconnecting means is operated, and means for moving said indicating device toward the platen while the platen remains connected with said line spacing devices.

56. In a typewriting machine, the combination of a platen, line spacing devices normally connected with said platen, means for disconnecting the platen from said devices, an indicating device normally removed from the platen, means for automatically moving said indicating device toward the platen when the first named means is operated, and means for varying the normal position of said indicating device.

57. In a typewriting machine, the combination of a platen, line spacing devices normally connected with said platen, means for disconnecting the platen from said devices, a scale normally removed from the platen, means for automatically moving said scale toward the platen when the first recited means is operated, and means for adjusting the normal position of said scale lengthwise of the platen.

58. In a typewriting machine, the combination of a platen, line spacing devices normally connected with said platen, means for disconnecting the platen from said devices, a scale normally removed from the platen, means for automatically moving said scale toward the platen when the first recited means is operated, and means for adjusting the normal position of said scale lengthwise of the platen, the adjusting means comprising a slot formed crosswise of the scale and a pin cooperative with said slot and adapted to be set in varying positions.

59. In a typewriting machine, the combination of a platen, line spacing devices normally connected with said platen, means for disconnecting the platen from said devices, a scale normally removed from the platen, means for automatically moving said scale toward the platen when the first recited means is operated, and a pointer cooperative with said scale.

60. In a typewriting machine, the combination of a platen, line spacing devices normally connected with said platen, means for disconnecting the platen from said devices, a scale plate provided with a double scale and normally removed from the platen, means for moving said scale plate toward the platen when said first recited means is operated, and a pointer cooperative with one of the scales on said scale plate, the other scale thereon cooperating directly with the work sheet on the platen.

61. In a typewriting machine, the combination of a swinging platen frame, a platen thereon, a scale on said platen frame, a pivotally mounted pointer, and means normally maintaining said pointer in cooperative position and permitting said pointer to swing away from the scale when the platen frame is itself swung.

62. In a typewriting machine, the combination of a swinging platen carrier, a platen thereon, a scale mounted on said platen carrier and provided with a double scale, a pivotally mounted pointer cooperative with one of the scales on said scale plate, the other of said scales being adapted to cooperate directly with the paper or work sheet on the platen, means for moving said scale plate toward and away from the platen, and means normally maintaining said pointer in cooperative position and permitting said pointer to swing away from said scale plate when the platen carrier itself is swung.

63. In a typewriting machine, the combination of a platen carrier provided with a roller, a guide rail mounted on the machine and cooperative with said roller, two yoke plates one secured near each end of the platen carrier, and a cross rod extending lengthwise of the platen carrier and connecting said yoke plates, said yoke plates being cooperative with said guide rail, a scale plate on said platen carrier, and a pointer pivoted on said guide rail, said cross rod cooperating with said pointer to maintain it normally in position to cooperate with said scale plate.

64. In a typewriting machine, the combination of a platen carrier provided with a roller, a guide rail mounted on the machine and cooperative with said roller, two yoke plates one secured near each end of the platen carrier, and a cross rod extending lengthwise of the platen carrier and connecting said yoke plates, said yoke plates being cooperative with said guide rail, a scale plate on said platen carrier, and a pointer pivoted on said guide rail, said cross rod cooperating with said pointer to maintain it normally in position to cooperate with said scale plate, and said cross rod permitting said pointer to swing away from the scale plate when the platen carrier itself is swung.

65. In a typewriting machine, the combination of a platen, a platen carrier, a carbon roll support mounted on and extending upward from said carrier, and a vertically arranged work sheet support or table pivotally mounted on said carbon roll support.

66. In a typewriting machine, the combination of a platen, and a platen carrier, a carbon roll support mounted on and extending upward from said carrier, and a work sheet support or table mounted for adjustment toward and from the carbon paper.

67. In a typewriting machine, the combination of a platen, a platen carrier, a carbon roll mounted at a distance from the platen so that the carbon paper may be led from the roll to the platen, and a work sheet support or a table mounted between said platen and carbon roll and movable toward and from the carbon paper.

68. In a typewriting machine, the combination of a platen, a platen carrier, a carbon roll support mounted on and extending upward from said carrier, said carbon roll support comprising side arms and cross bars, and a swinging table or work sheet support pivoted on said cross bars.

69. In a typewriting machine, the combination of a platen, a platen carrier, a carbon roll support mounted on said platen carrier and extending upward therefrom, a carbon roll mounted on said support above said platen and having a straight portion of the carbon paper extending down over the front of said platen, and a swinging table or work sheet support mounted on said carbon roll support and arranged behind said straight portion of said carbon paper, and constructed to be swung toward and away from said straight portion of the carbon paper.

70. In a typewriting machine, the combination of a platen carrier, a platen thereon, an upwardly extending frame on said platen carrier provided with cross rods, sleeves on said cross rods, arms on said sleeves, and a table or work sheet support pivotally connected with said arms.

71. In a typewriting machine, the combination of a platen carrier, a platen thereon, an upwardly extending frame on said platen carrier provided with cross rods, sleeves on said cross rods, arms on said sleeves, a vertically arranged table or work sheet support provided with ears and cross rods connecting said ears with said arms.

72. In a typewriting machine, the combination of a platen carrier, a platen thereon, an upwardly extending frame on said platen carrier provided with cross rods, sleeves on said cross rods, arms on said sleeves, a vertically arranged table or work sheet support provided with ears and cross rods connecting said ears with said arms, one of said cross rods being provided with finger pieces extending laterally beyond the sides of said table and operative to swing said table back and forth.

73. In a typewriting machine, the combination of a horizontally arranged platen carrier having a front bar and a rear bar, a platen on said carrier between said bars, a paper apron or guide plate pivotally mounted on said front bar, and paper fingers on said rear bar and adjustable lengthwise thereof.

74. In a typewriting machine, the combination of a rotary platen, a carbon roll support arranged to have the carbon paper from said roll delivered to the platen at the forward side of the latter, a paper feed device comprising a feed roll at the front of the platen and arranged to permit of the work sheet being inserted in the machine from the front.

75. In a typewriting machine, the combination of a horizontally arranged platen carrier having a front bar and a rear bar, a platen on said carrier between said bars, a paper apron or guide plate pivotally mounted on said front bar, a feed roller pivotally mounted on said front bar and spring-pressed toward the platen, marginal paper fingers adjustable on and lengthwise of said rear bar, a fixed central paper guide or finger on said rear bar, a carbon roll support, and means for directing the carbon paper from the roll downward over the front face of the platen and into coöperation with said feed roller.

76. In a typewriting machine, the combination of a horizontally arranged platen carrier having a front bar and a rear bar, a platen on said carrier between said bars, a feed roller pivotally mounted on said front bar and spring-pressed toward the platen, means for releasing said feed roller and locking it in released position, and a vertically arranged table or work sheet support arranged above the platen and adapted to direct a work sheet over the front face thereof.

77. In a typewriting machine, the combination of a platen, step-by-step line spacing devices normally connected therewith, means for disconnecting the platen from said devices and for turning it any desired extent, a line-finder normally removed from the platen, and means for moving said line-finder toward the platen and maintaining it in working position, said means being operated by said first recited means, said line-finder remaining in operative position while the platen is being turned independently of said line spacing devices.

78. In a bottom-strike typewriting machine, the combination with a rotary platen, a platen frame, of a line-finder mounted on the platen frame in front of the platen, and means for imparting to the platen continuous rotation of an extent equal to the distance from said line-finder to the writing line.

79. In a bottom-strike typewriting machine, the combination with a platen, a platen frame, of a line spacing wheel for said platen, means for disconnecting the platen from its line spacing wheel, a linefinder situated at the front of the platen and operatively connected with said disconnecting means, and a device for imparting to the platen a continuous rotation of an extent equal to the distance from said linefinder to the writing line.

Signed at the borough of Manhattan, city of New York, in the county of New York, and State of New York, this 28th day of October A. D. 1907.

CLIO B. YAW.

Witnesses:
J. B. DEEVES,
CHARLES E. SMITH.